Figure 1:
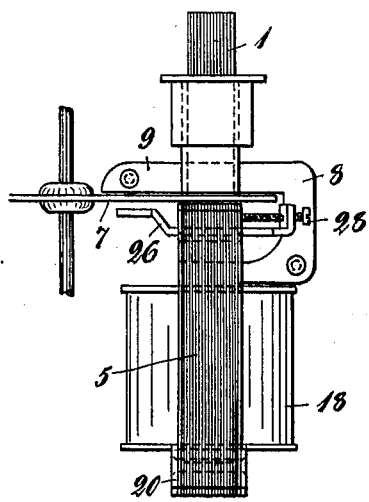

Dec. 8, 1931.  A. H. GARTNÄS  1,835,861

ELECTRIC METER OF FERRARIS TYPE

Filed Nov. 2, 1929   2 Sheets-Sheet 1

A. H. Gartnas
INVENTOR

By: Marks & Clerk
Attys.

Dec. 8, 1931.  A. H. GARTNÄS  1,835,861
ELECTRIC METER OF FERRARIS TYPE
Filed Nov. 2, 1929  2 Sheets-Sheet 2
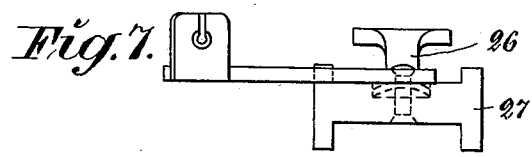
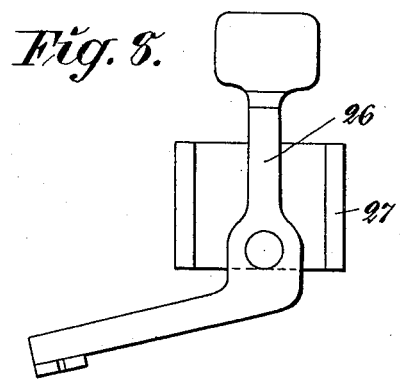
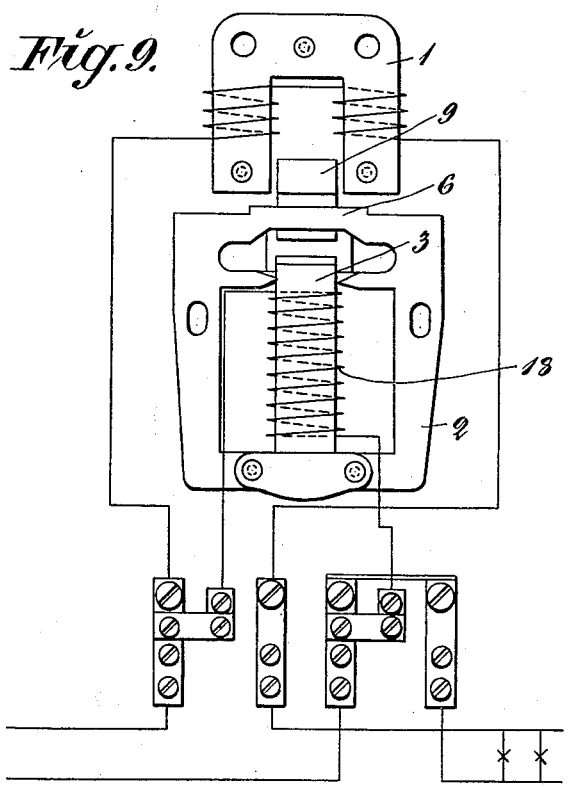

Patented Dec. 8, 1931

1,835,861

UNITED STATES PATENT OFFICE

ANDERS HERMAN GARTNÄS, OF STOCKHOLM, SWEDEN, ASSIGNOR TO TELEFONAKTIE-BOLAGET L. M. ERICSSON, OF STOCKHOLM, SWEDEN, A COMPANY OF SWEDEN

ELECTRIC METER OF FERRARIS TYPE

Application filed November 2, 1929, Serial No. 404,351, and in Sweden March 7, 1929.

The present invention relates to electric meters of the Ferraris type and has for its object to bring about a meter of this kind which combines small internal losses with a great torque and good measuring properties. It is a well-known fact that a Ferraris meter is affected by a certain lack of precision in the measuring results which substantially depends upon the braking action exerted by the current field as well as by the voltage field upon the rotor which braking action varies with the power supplied to the meter and cooperates with the braking force ordinarily caused by means of a permanent magnet. The braking force exerted by the current field becomes the more preponderant in relation to the braking force of the brake magnet the higher is the load and will thus have a disturbing influence upon the measuring result especially at high loads. A similar reaction is also caused by the braking force produced by the voltage field but the faults caused thereby are considerably less because the fluctuations of the voltage are comparatively much less pronounced than the fluctuations of the current. The tendency is therefore to increase the force of the voltage field and at the same time to reduce the force of the current field. Such a displacement in the proportion between the forces produced by the voltage field and the current field is of advantage also from the point of view that the measuring errors caused by the voltage field may be more easily compensated than the faults caused by the current fields. An increase of the force of the voltage field has, however, the disadvantage that the internal losses of the meter are increased at the same time. The present invention has for its main object, to reduce the internal losses of the meter by a suitable design of the magnet system of the voltage field and thereby render possible an increase of the force of said field. The invention consists in certain improvements in the design of the voltage field magnet of the ordinary three-legged type usually used in meters of the present kind and is substantially characterized in that the laminations of the magnet core are stamped out in such a shape that they form two pole pieces disposed opposite one another in the longitudinal direction of the central leg. Thereby the useless magnetic resistance in the magnet circuit is so reduced that the force of the voltage field may, in comparison with previously known constructions, be considerably increased without a corresponding increase in the internal power losses. The magnet core is preferably composed of two lamination bundles detachably connected with one another the one of said bundles forming the central leg and the other the two outer legs. The disposition is such that the laminations in the one bundle extend perpendicularly to the laminations in the other bundle. Said disposition facilitates the stamping out of the laminations of the central leg in such a shape that they may form a counter-pole which extends around the edge of the rotor disk whereby a good magnetic closing of the flux through the rotor is obtained.

The invention will be more closely described with reference to the accompanying drawings which show an embodiment of the magnet system in a single phase meter.

Figure 2:
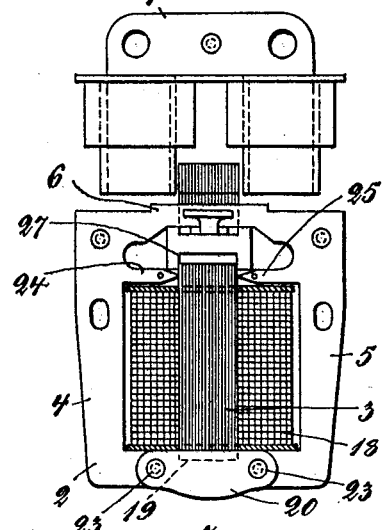
Figure 3:
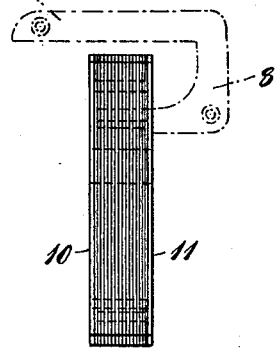
Figure 4:
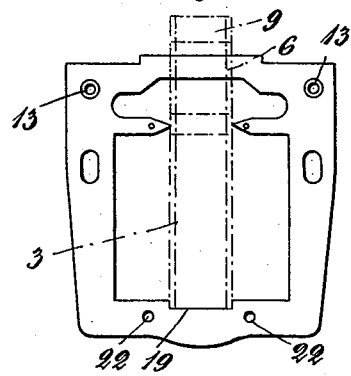
Figure 5:
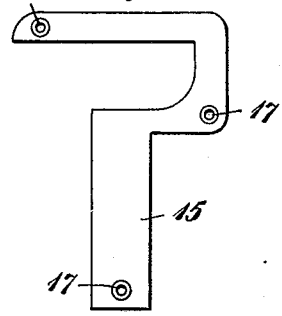
Figure 6:
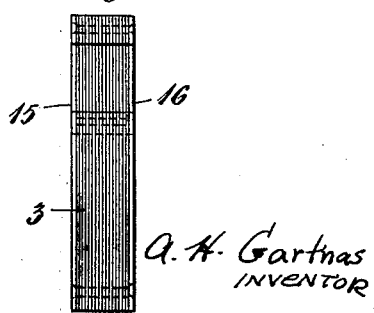

Figures 1 and 2 show two vertical projections of the magnet system in two mutually perpendicular planes. Figures 3 and 4 show corresponding projections of the one of the two lamination bundles forming the iron core of the voltage magnet. Figures 5 and 6 show similar projections of the other lamination bundle. Figures 7 and 8 show in side elevation and in plan view a device for the compensation of the frictional resistance in the rotor bearings. Figure 9 is a circuit diagram showing the connection of the current and voltage coils to the lighting supply mains.

The magnet system comprises a U-shaped current field magnet 1 and a three-legged voltage field magnet which, according to the invention, is composed of two lamination bundles 2, 3 the one 2 of which forms a closed frame wherein two opposing sides 4, 5 form the two outer legs whereas one of the remaining sides forms a pole piece 6 disposed immediately beneath the rotor disk 7 right above the central leg 3. The laminations in the bundle forming the central leg are disposed perpendicularly to the laminations in the frame 2 and are stamped out in such a shape that they form a yoke-shaped projection 8 surrounding the edge of the rotor disk the upper portion of said projection forming a pole face 9 on the upper side of the rotor disk disposed right opposite the pole face 6. Each lamination bundle is in known manner composed of a number of thin iron sheets which are tied together by means of covering plates of the same shape as the laminations and by through rivets. The frame 2 is thus provided with covering plates 10, 11 which are united with the laminations by means of rivets 13. The central leg is in similar manner provided with two covering plates 15, 16 united with each other by means of through rivets 17. The central leg supporting the voltage coil 18 is inserted in a recess 19 in the yoke portion of the frame 2 and is held in position by means of two plates 20, 21, disposed on both sides of the frame 2 which plates are united by means of screws or rivets 23 extending through holes 22 in the frame. The central leg 3 is also supported by two projections 24, 25 formed by the laminations of the frame which projections form magnetic shunts for the flux of the voltage magnet. Said magnetic shunts have a tapered cross section pointed towards the central leg and they form by their ends a sharp edge extending perpendicularly to the laminations of the frame said edge bearing against the side of the central leg. The purpose of said disposition of the shunts is to compensate those measuring errors which occur on account of fluctuations in the voltage. On account of the acute shape of the shunts the magnetic resistance of the shunts will vary with the voltage in such a manner that the desired compensation is obtained because the magnetic saturation of the shunts takes place more gradually than in case the shunts in known manner were bearing against the central leg along their entire cross sectional surface. By disposing the shunts integral with the frame 2 a simplification in the manufacture is obtained and at the same time an improvement of the magnetic properties of the magnet circuit. The necessary contact between the magnet shunts and the sides of the central leg is obtained thereby that the lamination bundle 3 always is somewhat elastic in transversal direction especially if the rivets 17 are so disposed that there are no rivets adjacent to the points of contact between the shunts and the central leg.

The described embodiment of the core of the voltage field magnet renders possible a considerable reduction of the useless magnetic resistance in the magnet circuit. This advantageous feature of the magnet system depends especially upon the fact that the two pole pieces 6, 9 of the voltage magnet are disposed integral with the magnet core by the stamping out of the laminations in a suitable shape. This shaping of the pole pieces directly by stamping out the laminations is in turn rendered possible by the fact that the magent core, as above described, is composed of two lamination bundles, the laminations of the one bundle extending perpendicularly to those of the other bundles. The one lamination bundle may then preferably be designed as a closed frame although it is not essential, of course, that the frame is closed all the way round. The design of the magnet core in the shape of two detachably united parts is rendered possible at the same time as the voltage coil 18 may be easily placed in position or removed respectively for the purpose of being replaced or repaired.

To compensate the frictional resistance in the rotor bearings the magnet system is in known manner provided with a rotatable arm 26 of magnetic material on the bottom side of the rotor disk 7 which may be set in different positions in relation to the pole piece 9. The arm 26 is pivoted on a bearing piece 27 of non-magnetic material such as brass which is forced into the frame 2 between the pole piece 6 and the magnetic shunts 24, 25. The arm may be set by means of a screw 28 tapped into the one end of the arm which screw, upon setting the arm, bears against the side of the frame 2.

I claim:

1. In an electric meter of the Ferraris type in combination a laminated three-legged voltage field magnet composed of two lamination bundles the one of which forms the central leg and the other a closed frame on which the central leg is mounted and two projections on said first mentioned bundle arranged so as to form magnetic shunts, said shunts being tapered towards their ends.

2. In an electric meter of the Ferraris type in combination a laminated three-legged voltage field magnet composed of two lamination bundles the one of which forms the central leg and the other a closed frame on which the central leg is mounted and two projections on said first mentioned bundle arranged so as to form a sharp edge extending transversely to the laminations.

In testimony whereof I affix my signature.

ANDERS HERMAN GARTNÄS.